A. G. HAGUE.
OFF-BEARING MECHANISM FOR TILE CUTTERS.
APPLICATION FILED JULY 22, 1919.

1,361,985.

Patented Dec. 14, 1920.

A. G. HAGUE.
OFF-BEARING MECHANISM FOR TILE CUTTERS.
APPLICATION FILED JULY 22, 1919.

1,361,985. Patented Dec. 14, 1920.
5 SHEETS—SHEET 2.

Inventor
Alfred G. Hague

A. G. HAGUE.
OFF-BEARING MECHANISM FOR TILE CUTTERS.
APPLICATION FILED JULY 22, 1919.

1,361,985. Patented Dec. 14, 1920.
5 SHEETS—SHEET 4.

Inventor
Alfred G. Hague

A. G. HAGUE.
OFF-BEARING MECHANISM FOR TILE CUTTERS.
APPLICATION FILED JULY 22, 1919.
1,361,985. Patented Dec. 14, 1920.
5 SHEETS—SHEET 5.
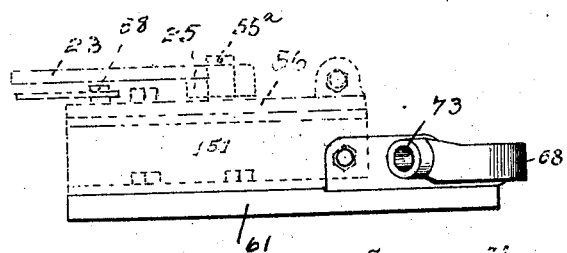
Fig. 15.
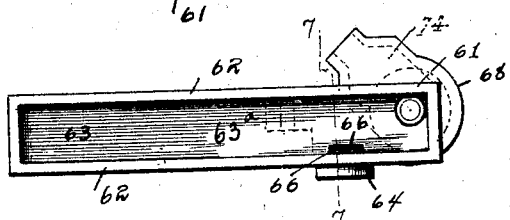
Fig. 14.
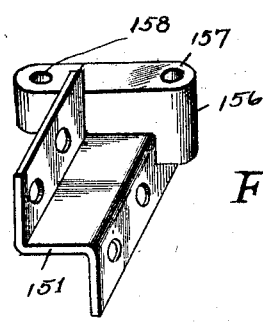
Fig. 13.
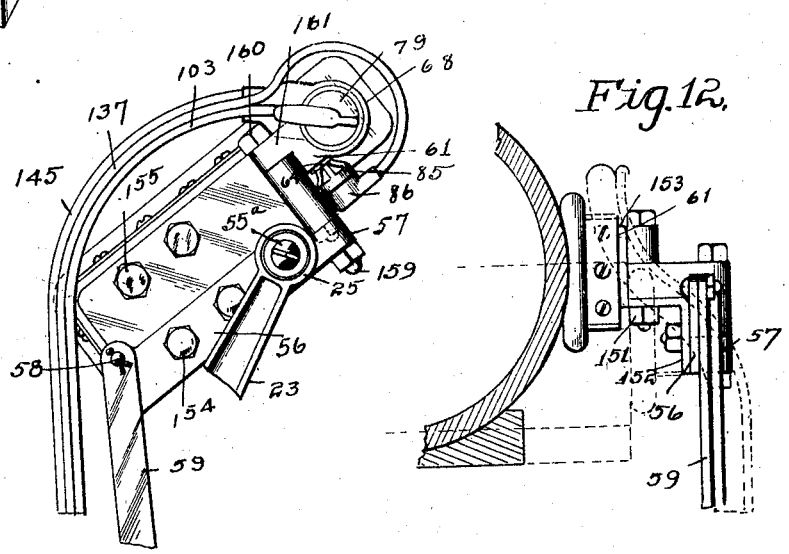
Fig. 12.
Fig. 11.
Inventor
Alfred G. Hague

UNITED STATES PATENT OFFICE.

ALFRED G. HAGUE, OF ADEL, IOWA, ASSIGNOR TO HALVER R. STRAIGHT, OF ADEL, IOWA.

OFF-BEARING MECHANISM FOR TILE-CUTTERS.

1,361,985.   Specification of Letters Patent.   Patented Dec. 14, 1920.

Application filed July 22, 1919. Serial No. 312,572.

*To all whom it may concern:*

Be it known that I, ALFRED G. HAGUE, a citizen of the United States, residing at Adel, in the county of Dallas, State of Iowa, have invented an Off-Bearing Mechanism for Tile-Cutters, of which the following is the specification.

This invention relates to the clay industry and particularly to a mechanism for moving hollow building blocks or drain tile from a cutter table while in a plastic condition and placing the same on an endless conveyer, in a substantially vertical position.

The mechanism illustrated in the accompanying drawings, is designed to be used in connection with a cutting table such as is in general use. The conveyer of these tables is designed to carry a horizontal moving column of plastic clay fed from a die and is advanced simultaneously therewith through the frictional contact between the column and the said conveyer. This column of plastic material is generally formed hollow, round or rectangular in cross section and often irregular in cross section. The column is cut into short pieces forming tile or building blocks, after which it is desirable to place the blocks or tile on a second conveyer in a vertical position. This second conveyer is run at a considerably higher rate of speed than the column of material so that the blocks or tile may be spread apart sufficiently to enable workmen to conveniently grasp and remove them.

The object of my invention is to provide an off-bearing mechanism of simple, durable, and inexpensive construction, to rapidly receive plastic tile or building blocks from a cutting table and deliver them to a conveyer belt, without stopping or interfering with the action of the cutter.

A still further object is to provide an off-bearing mechanism driven by independent power and timed to the cutting table in such a manner as not to materially increase the power required to move the conveyer and the said cutting table.

A further object is to provide in an off-bearing mechanism, means whereby the plastic tile or hollow blocks, and the like, may be quickly and firmly grasped and removed from the cutter table without crushing or warping the walls of the said tile or blocks.

A further object is to provide in an off-bearing mechanism having means for removing plastic tile or hollow blocks from the cutting table, new and improved means for timing the off-bearing mechanism with the conveyer of the cutting table.

A further object is to provide with an off-bearing mechanism driven by independent power and timed to the conveyer of the cutting table, a new and improved mechanism for quickly adjusting the off-bearing mechanism to receive tile and blocks of different sizes and shapes, without readjusting the timing mechanism.

There are other objects which will be apparent to those skilled in the art, and which need not be enumerated in detail.

My invention consists of the construction, arrangement and combination of the various parts of a device, whereby the objects contemplated are attained, as hereinafter more fully set forth, pointed out in my claims and illustrated in the accompanying drawings, in which:

Fig. 11 is a detail side elevation of one of the pneumatic gripers, showing the adjusting plate in position and the manner in which the head is set for a larger and different shaped tile than shown in Fig. 1.

Fig. 12 is an end elevation of Fig. 11, showing the manner in which the adjusting plate is applied.

Fig. 13 is a perspective view of the adjusting plate.

Fig. 14 is a detail side elevation of the head member, with the diaphragm and the exhaust valve removed.

Fig. 15 is a top elevation of Fig. 14 showing the adjusting plate and supporting plate in dotted lines.

Figure 1:
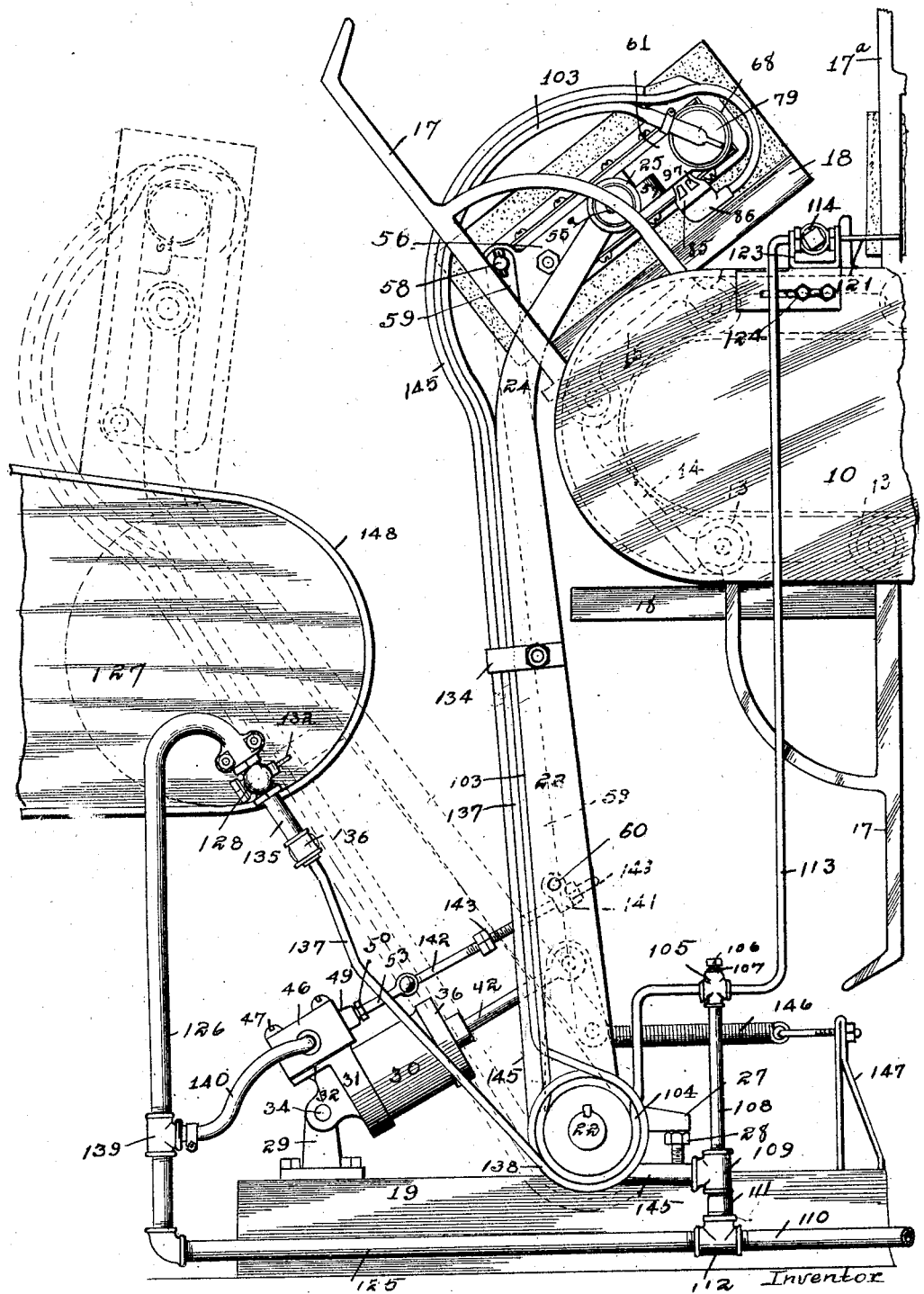
Figure 1 is a side elevation showing the grasping and delivering mechanism partly dotted in, in one position of its movement, also showing the manner in which the grasping and delivery mechanism is moved relative to the cutter table and the receiving conveyer, only end portions of the conveyer and cutting table being illustrated.

Referring to the drawings, the reference numeral 10 indicates the frame of the tile cutter and 11 the supporting legs. This tile cutter is of the ordinary construction. The frame 10 is provided with track members 12. The track members 12 are designed to receive rollers 13 of a conveyer 14. The conveyer 14 is formed of a series of transverse plates 15 secured together by means of links 16 and connected to the rollers 13 by suitable pins. Each end of the plates 15 is provided with perpendicular guide members 17. Secured to the central portion of each alternate plate 15 is a pallet 18. Each of these pallets 18 is designed to receive a plastic hollow block or drain tile. The pallets, designed to carry building blocks, are provided with a flat face as illustrated in Fig. 1 and those for the drain tile are provided with a concave face, as shown in Fig. 12.

The side members of the frame 10 are of considerable length and for that reason the pallets 18 lie in a horizontal plane as they move along the top portion of the frame 10, the pallets 18 being of such length as to nearly touch each other when in a horizontal position. The column of plastic material is fed horizontally upon the top faces of the top pallets, and the conveyer 14 is moved horizontally by the friction between the column of the plastic material and the top of the pallets 18.

Figure 2:
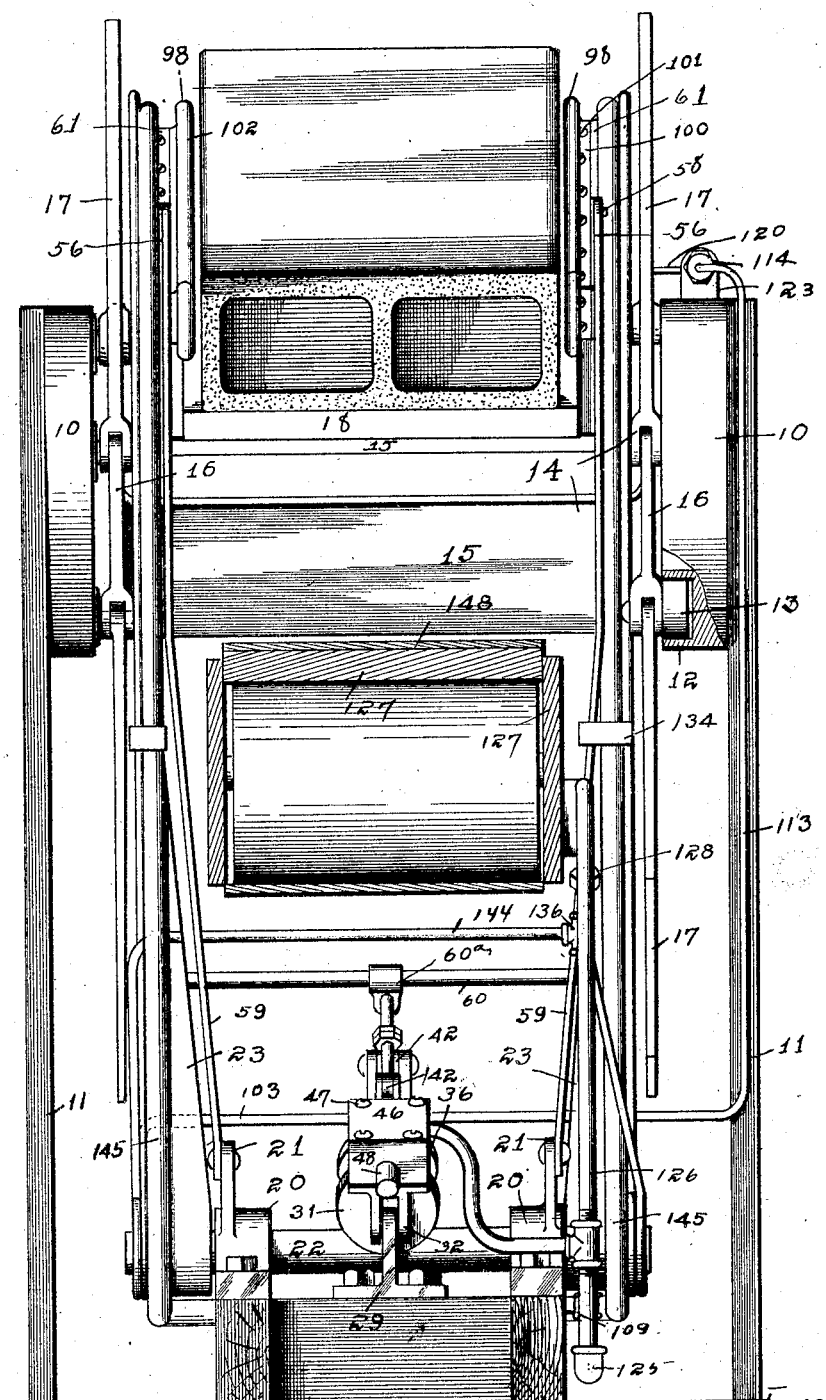
Fig. 2 is an end elevation of Fig. 1.
Figure 3:
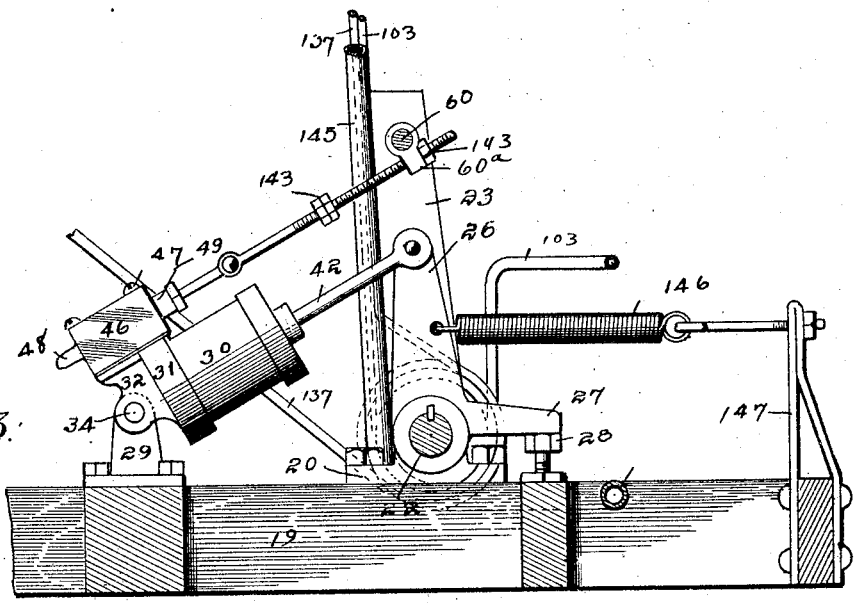
Fig. 3 is a sectional detail side elevation of the main operating mechanism.

Mounted beneath the delivery end of the conveyer 14 is a base member 19. This member is provided with bearings 20, each of which is provided with an upwardly extending portion 21. The bearings 20 are designed to receive a rock shaft 22. Each end of the shaft 22 is provided with an upward extending arm 23, which is provided with a curved portion 24 near its upper end. The bearing 25 is provided in the upper end of each member 23 as illustrated in Figs. 1 and 11 of the drawings. It will be seen from Fig. 2 that these members 23 are spaced apart a distance considerably greater than the width of the tile, or block, and are so spaced as to be capable of movement between the guide members 17 of the conveyer 14. The central portion of the rock shaft 22 is provided with an upright arm 26, the lower end of which has an extension 27, the extension 27 being designed to engage an adjusting bolt 28 mounted in the base member 19. (Fig. 3.)

Secured to the base 19 and to the left of the shaft 22, is a support 29 designed to receive a cylinder 30. This cylinder 30 is provided with a head member 31 having a bifurcated portion 32 designed to engage the sides of the member 29 and provided with openings 33. The openings 33 are designed to receive a pin 34 in the upper end of member 29.

The cylinder 30 is provided with a head 36, the head 36 being provided with openings 37. The cylinder 30 is designed to receive a piston 38, provided with a leather washer 39 which is clamped in position by means of the washer 40, and the nut 41. The nut 41 is mounted on the inner end of the piston rod 42. The outer end of the piston rod 42 is pivotally mounted to the upper end of the arm 26. The upper portion of the head member 31 is provided with a valve seat 43 having an opening 44 in communication with the outside atmosphere and an opening 45 is in communication with the inside of the cylinder 30. The seat member 43 is designed to receive a chest 46 which is secured in position by means of bolts 47. The chest 46 is provided with a boss 48 at one end, and a stuffing box member 49 at the other. The stuffing box member is designed to receive a gland 50. The boss 48 is provided with a recess 51 in line with the opening 52 in the bottom of the stuffing box 49. The opening 52 and the recess 51 are designed to receive a valve rod 53. This rod 53 is designed to operate a slide valve 54, which is similar to those used in steam engines, and is secured to the rod by means of the adjusting nuts 55. The purpose of this cylinder and controlling valves will be more fully hereinafter set forth.

Pivotally mounted on the upper ends of the uprights 23 in the bearings 25, by a pin 55$^a$, is a plate 56 provided at one end with a boss 57 and a pivot pin 58 at its opposite end. One end of a link 59 is connected to the pin 58 and the opposite end is pivotally connected to the upper end of the member 21, as illustrated in Figs. 2 and 11 of the drawings.

The upright members 23 are connected near their lower ends by means of a transverse rod 60.

Figure 7:
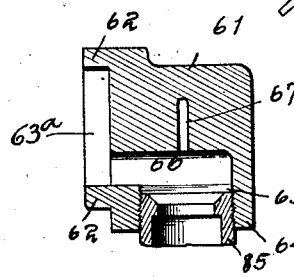
Fig. 7 is a detail sectional view showing the air passage to the exhaust valve and is taken on the line 7—7 of Fig. 14.

Designed to be secured to the plates 56, I have provided what I shall term gripers 60$^a$. These devices comprise head members 61, each of which is rectangular in elevation and provided with a flanged portion 62 and a back portion 63. The flanged portion is designed to form a recess 63$^a$, the purpose of which will be made clear. The lower flange 62 is provided near one end with a boss 64. This boss 64 is provided with an opening 65 and an air passage 66 communicating with the recess 63ª formed by the flanges 62, the construction of which is illustrated in Fig. 7. The hole 67 is provided centrally above the opening 65 and extended into the head member 61. This passage 66 I shall term as the exhaust passage. At the same end of the member 61, I have provided a cylindrical portion 68 having cylindrical recesses 69 and 70, the recess 70 being internally screw threaded at its outer end. The recess 70 is of considerably larger diameter than the recess 69, as clearly illustrated in Fig. 5 of the drawings.

Figure 5:
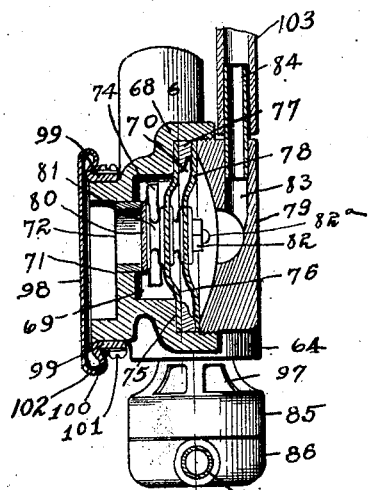
Fig. 5 is a detail transverse sectional view of the intake valve mechanism for the pneumatic gripers, showing the exhaust valve cage in elevation.
Figure 6:
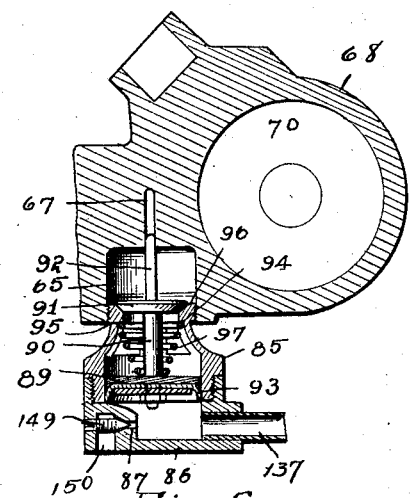
Fig. 6 is a detail sectional view of the secondary exhaust valve, and a fragment of the pneumatic head, taken on the line 6—6 of Fig. 5.

The bottom of the recess 69 is provided with an opening 71 which is designed to receive a cylindrical valve seat 72. The recess 69 is in communication with an opening 73 through the slot 74. (Figs. 5 and 15). The shoulder 75 formed between the recesses 69 and 70, is designed to receive a flexible diaphragm 76 and is held in position by means of a ring 77. A second diaphragm 78 is mounted on top of the ring 77 and secured in position by means of the head 79, the said head being screw threaded and designed to co-act with the screw threaded portion of the recess 70. The diaphragms 76 and 78 are provided with a valve 80 designed to engage the valve seat 72. The valve 80 is secured to the diaphragms by means of the washers 81, a nut 82 and a bolt 82ª.

It will be noticed by the above construction that the diaphragm 78 is provided with a considerably greater area than the diaphragm 76, the purpose of which will be made clear in the description of the operation.

The head 79 is provided with a passage 83 and the pipe 84. The opening 65 is screw threaded and designed to receive a screw threaded valve cage 85. This cage 85 is designed to receive a screw threaded head 86 at its lower end and is provided with a valve seat 96 at its upper end. The head 86 is provided with a needle control passage 87 and a pipe 137. The lower end of the cage 85 is provided with a piston 89 having a stem 90, the upper end of which is provided with a valve 91. The valve 91 is provided with an upward extending stem 92, which is designed to be slidably mounted in the hole 67. The piston 89 is provided with a packing member 93. The spring 94 is provided on the upper side of the piston 89 and is designed to engage at its upper end with the shoulder 95. This spring is for the purpose of seating the valve 91 to the seat 96 in the upper end of the cage 85. The cage 85 is provided with openings 97, which is for the purpose of permitting the exhaust air to escape.

It will be seen upon referring to Fig. 2, that there are two gripers 60ª, on opposite sides of the block or tile and only the one on the right side will be described, as they are both alike and operate in the same manner, and simultaneously.

Figure 10:
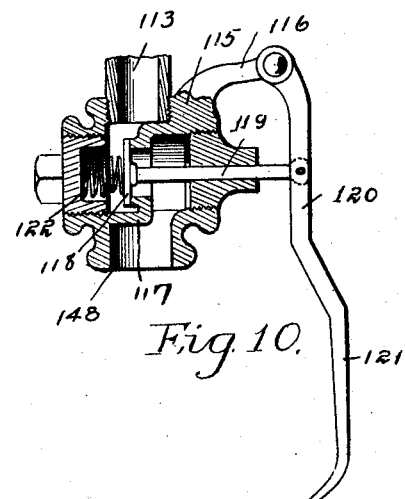
Fig. 10 is a detail longitudinal sectional view of the intake, timing and controlling valve.
Figure 8:
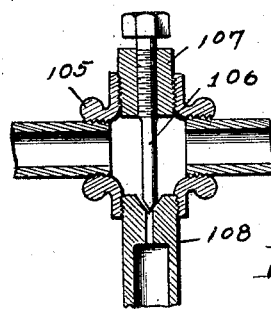
Fig. 8 is a detail sectional view of one of the controlling valves.

For gripping the blocks, I have provided a diaphragm 98 of flexible material such as rubber or leather. This diaphragm is provided with flange members 99 designed to engage the outer faces of the flanges 62 of the head member 61. These flanges 99 are secured in position by means of plates 100 and the set screws 101. The face of the diaphragm 98 is considerably wider than the face of the head member 61 and is provided with a looped portion 102. This is for the purpose of making the diaphragm more flexible. The pipe 84 is connected to a flexible tube 103, which extends along the side of the right hand member 23 and forms a coil 104 concentric with the shaft 22 and extends upward to a valve 105, the tube 103, entering the valve at its end. The tube on the left hand side of the machine is extended across to the valve 105 as shown in Fig. 2. This valve 105 is illustrated in Fig. 8 and consists of a needle 106 adjustably mounted in the block 107 and is designed to engage a seat in the upper end of the tube 108. This tube 108 extends downward to a T 109, which is in communication with the main air pipe 110 through the nipple 111 and the T 112. The valve 105 is also in communication with a tube 113 which extends upward adjacent to one side of the member 10 and is in communication with the timing valve 114. This timing valve is shown in section in Fig. 10 of the drawings and is provided with a casing 115 having a bracket 116 and a valve seat 117. The said valve seat is provided with a valve 118, the stem 119 of which is designed to engage a pivot lever 120, one end of which is mounted in the bracket 116. The free end of the lever 120 is provided with a cam shaped portion 121. A spring 122 is mounted back of the valve 118 for the purpose of seating the valve and actuating the lever 120 in one direction. The valve 114 is provided with a bracket 123 which is adjustably mounted on the side of the member 10 by means of screws 124. The valve 114 is so mounted on the member 10, that the lever 120 will have the cam portion 121 lying horizontally in the path of the guide arms 17 when the said lever is in a normal position. As the guide arms advance they engage the cam 121, causing the valve 118 to be opened, the purpose of which will be more fully set forth.

Figure 9:
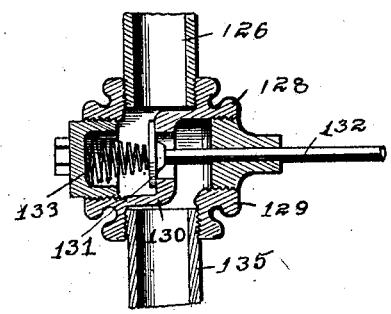
Fig. 9 is a detail sectional view of the primary exhaust valve.

Extending to the left from the T 112 is a pipe 125 having an upward extending portion 126, the upper end of which is secured to the side of the conveyer 127 and has mounted to it a valve 128. This valve is shown in section in Fig. 9 and is provided with a casing 129 and seat 130 and a valve member 131, the said valve member being provided with a stem 132. A spring 133 is mounted back of the valve 131 for the purpose of seating it. This valve 128 is so arranged as to lie in the path of one of the uprights 23, the stem 132 of which is designed to be engaged by the plate 134. A nipple 135 is mounted in the valve 128 and provided with a T 136, the said T having a tube 137 extending downward and forming a concentric coil 138 around the right hand end of the shaft 22 and extending upward along the front side of the right hand member 23 and making connection with the end of the pipe 88 of the right hand member 86. The pipe 126 is provided with a T 139, the said T being connected to a flexible pipe 140, one end of which is connected with the chest 46 and is in communication therewith.

Rotatively mounted on the rod 60 is a lug 141 designed to slidably receive a rod 142, one end of which is pivotally connected to the valve rod 53. Nuts 143 are provided and adjustably mounted on the rod 142.

Connecting with the T 136, I have provided a transverse pipe 144 which extends across the machine and is connected to a tube 137 on the left hand upright 23, similar to the one described.

Connecting the T 109, I have provided a flexible tube 145, which extends beneath the shaft 22 and upwardly adjacent to the front side of the uprights 23, the upper end of which is connected to the opening 73 of the intake valve. There is a similar tube provided for the left intake valve, the tube on the left hand side of the machine communicating with the inside of the 4 way T 109.

For balancing the weight of the gripers 60ª and holding the uprights 23 in a vertical position, I have provided a spring 146, one end of which is adjustably secured to a bracket 147, said bracket 147 being mounted on the base member 19.

The conveyer 127 is provided with a belt 148. This conveyer is for the purpose of receiving blocks as they are delivered from the cutter and under a speed considerably higher than the speed of the cutter conveyer 14 for the purpose of separating the blocks so that workmen may grasp and remove them from the conveyer and load them on cars to be delivered to the drying room.

Figure 4:
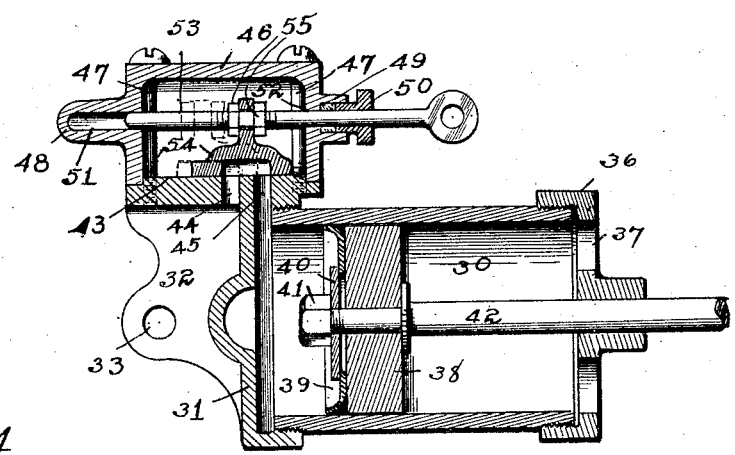
Fig. 4 is a detail longitudinal sectional view of the main operating cylinder and its controlling valve.

In operation the pipe 110 is in communication with an air supply tank of the ordinary construction which is provided with suitable reducing valves and regulators for keeping a constant pressure within the pipe 110. Assuming that the cutter conveyer 14 is being operated and delivering blocks, one of which is in the position illustrated in Fig. 1, and the arms 23 are in their normal position with the member 27 against the set screw 28 and held in said position by means of the spring 146, and that the pipe 110 is in communication with a suitable air supply as above described, then: The tubes 145, the recesses 69 and the cavities formed in members 79 above the diaphragms 78 will be under air pressure equal to that in the pipe 110, the cavity in each of the heads 79 are in communication with the said air through the tubes 103 and is under air pressure. The valves 80 as shown in Fig. 5, will also be closed, together with the exhaust valves 91. The valves 131 and 118 are also closed. The valves 106 and 149 are slightly opened. The chambers, formed in the head of the members 86, are at atmospheric pressure due to the fact that the valve 149, in the member 86, is partly opened, which permits the previous air pressure in the pipe 88 and the tube 137, to be reduced through the opening 150. A further movement of the conveyer 14 will cause the guide member 17ª to engage the cam portion 121 of the lever 120 and the said lever moved outward. This will cause the valve 118 to disengage the seat 117 and permit the air, under pressure, within the tubes 103 to escape, reducing the pressure within the head 79. The diaphragms 78 are of considerably more area than the diaphragms 76. When the air has escaped from the pipes 103 through the T 105 and the valve 114, the pressure back of the diaphragms 78 will be reduced to that of the atmosphere. The pressure on the inside of the diaphragms 76 will cause the valves 80 to disengage the seats 72 thereby permitting the air from the recess 69 to enter the recess 63ª of the head 61. When this is done, the diaphragms 98 will be expanded and engage the edges of the tile sufficiently to bear the weight of the same and without crushing the sides, from the fact that it is distributed over a considerable area. When the diaphragms have engaged the sides of the tile, as described, the upper ends of the members 23 will be oscillated to the left through the action of the pallets 18. After the pivoted portion of the members 23 has passed a vertical line running through the center of the shaft 22, the arms will be carried by gravity to the position shown in dotted lines. The link 59 will cause the heads to be rotated sufficiently to cause the tile to extend in a perpendicular position relative to the conveyer belt 148, and the left hand end of the tile parallel with the face of said conveyer. Just before the end of the tile has reached the conveyer 148, the plate 134 will engage the valve stem 132 causing the valve 131 to be opened. The opening of the valve 131 will permit air under pressure to rush in the pipes 137 which will in turn communicate with the lower end of the pistons 89 and cause the said pistons to be elevated and the valves 91 to disengage their seats against the action of the springs 94. This will permit the air within the recess 63ª to be exhausted into the atmosphere through the openings 97, and the diaphragms 98 to be moved to their normal positions, as shown in Fig. 5. A certain amount of air will escape through the valve 149 but very slowly, and not enough to prevent the pistons 89 from being elevated while the valve 131 is opened, but as soon as the valve 131 is closed the pressure within the tube 137 will be reduced through said valve. This will release the block and permit it to fall on the belt 148. Just before the uprights 23 have reached the position shown by dotted lines, a lug 60ª and the rod 60 will have engaged the lower nuts 143 of the rod 142, the engagement of which would cause the slide valve 54 to be moved to the left as shown in dotted lines, Fig. 4, causing the opening 45 to be uncovered, permitting air from the pipe 140 and the chest 46 to enter the cylinder 30 and cause the piston 38 to move outwardly, causing the uprights 23 to assume their normal position, as shown in Fig. 1. As the uprights 23 approach their normal position, the lug 60 will engage the top nut 143 and cause the valve 54 to be slid to the position shown in solid lines, Fig. 4, and the air within the cylinder 35 to be exhausted through the opening 44. It will be noted that by adjusting the lower nuts 143 the valve 54 may be opened just before the uprights 23 have reached the dotted position. This will permit air to enter in back of the piston 38 and form a cushion for the said uprights when approaching their limit of movement. When the uprights return from their dotted position, the valve 131 will be closed by the lug 134 disengaging the valve stem 132. This will shut off the air pressure in the tubes 137 from the pipe 126, and from the lower end of the piston 89. The air that is retained in the tubes 137 will gradually escape through the openings 87 and 150. This will permit the valves 91 to be seated during the time that the uprights 23 travel from the dotted line position to their normal position. When the guide member 17ª has passed the cam portion 121 of the member 120, the valve 118 will be closed during the last portion of the time while the members are passing from their normal position to their delivery position. The needle valve 106 will permit air to gradually reëstablish the pressure within the pipes 103 until the pressure within the cavity above the diaphragms 78 is equal to the pressure within the recess 69.

As the uprights move to their delivery position, on account of the diaphragms 78 being of a greater area than the diaphragms 76, the valves 80 will be seated against their seats 72 and are closed before the members 23 reach their dotted or delivery position, and before the time the exhaust valve 91 is opened.

It will be seen that by adjusting the valve 114 longitudinally relative to the member 10, the timing of the valves 80 may be very accurately obtained.

The adjustment of the valve 54 will also be very accurately regulated to the nuts 143, and the timing of the valve 128 can be regulated by its position relative to the conveyer 127. The tension on the springs 146 is intended to be just sufficient to balance the weight of the head members after the block has been released and is just sufficient to hold the lug 27 against the nut 28. By this arrangement it will be seen that the diaphragms and the head members can be accurately timed with the blocks.

The cutting tables, such as illustrated in Fig. 2 of the drawings, are adapted to cut tile and blocks of different sizes and shapes. To adapt this off-bearing mechanism to tile or blocks of different sizes and shapes, it is necessary to raise or lower the head member relative to the plate 56. This I accomplish by means of an angular plate 151 provided with a downwardly extending portion 152 and an upwardly extending portion 153. The downwardly extending portion 152 is designed to be bolted to the member 56 by means of bolts 154 and the member 153 is designed to be secured to the head 61 by means of bolts 155, as shown in Figs. 11 and 12. Adjacent to one end of the plate 151 is a lug 156 provided with the openings 157 and 158. The opening 157 is designed to receive a bolt 159 extending through the boss portion 57 of the member 56. A bolt 160 extends through the boss 161 of the head 61 into the flange portion 156. The head is thereby rigidly secured to the plate 56.

Fig. 12 shows the head applied to a portion of a round tile, the tile being smaller in diameter than the block shown in Figs. 1 and 2. It is evident that blocks of other sizes and shapes may be provided for by the proper proportioning of the angular plate 151.

Cutting machines of the class described and illustrated in the drawings, are designed to cut and deliver plastic blocks and tile at a rate as high as sixty per minute, each of which oftentimes weighs 20 pounds. The saving in manual labor by this machine is evident. Furthermore, it is impossible for an operator to set a block square on the receiving belt 148. This has a tendency to cause the corners to be rounded or the end of the block to become warped. This can be accurately done with my mechanism through the pivotally mounted head on the supports and the link motion.

In cutting machines of the class described, the speed of the column of plastic material as it comes from the dies, varies inversely as the sectional area of the plastic material in the block. Cutting tables of this class are designed to carry blocks of various sizes and shapes and for that reason the sectional area of the blocks will vary and therefore the speed of the column.

It is therefore necessary to provide a mechanism which will quickly and positively adjust or time itself automatically to the speed to which the blocks or tiles are delivered. This is accomplished in my mechanism by the timing valves 114 and 128 and adjusting nuts 143. It is evident that a dragging or scraping between the edges of the blocks and the diaphragms would result unless the diaphragms are made to engage the sides of the blocks very quickly. This I accomplish by placing the intake and exhaust valves directly in the pneumatic heads so that the length of the air passages between the valves in said heads is reduced to the minimum. When these valves are opened, the cavities beneath the diaphragms will be quickly filled or exhausted. The said intake and exhaust valves are controlled by the primary valves, the action of which is not necessarily so rapid.

By using flexible, pneumatic diaphragms, it is possible to adapt them to the unevenness of the surface and to distribute the pressure evenly over said surface without crushing or warping the shape of the blocks. By this arrangement, the pressure may also be reduced to a minimum and can be controlled by the ordinary pressure reducing valves in the supply tanks. By the adjusting plate described, it is possible to adjust the diaphragms in such manner as to grip tile of various sizes and shapes.

It will therefore be seen that I have provided an off-bearing machine for tile cutters adapted to automatically remove plastic hollow building blocks or drain tile of various diameters and shapes from a cutter table and deliver them to a conveyer belt, thereby saving considerable labor in the manufacture of clay products.

I claim.

1. In a device of the class described, opposite heads spaced apart, a pneumatic diaphragm on the inner face of each head, a support for said heads, means for moving said heads from a receiving position to a delivery position, means for inflating the diaphragm when in a receiving position, means for deflating the diaphragm at the delivery position, and means for returning the heads to a receiving position.

2. In a device of the class described, opposite heads spaced apart, a pneumatic diaphragm on the inner face of each head, a support for said heads, means for moving said heads from a receiving position to a delivery position, means for inflating the diaphragm when in a receiving position, means for deflating the diaphragm at the delivery position, means for oscillating the said heads in their supports and means for returning the heads to a receiving position.

3. In a device of the class described, opposite heads spaced apart, a pneumatic diaphragm on the inner face of each head, a support for said heads, means for moving said heads from a receiving position to a delivery position, means for inflating the diaphragm when in a receiving position, means for deflating the diaphragm at the delivery position, and pneumatic means for returning the heads to a receiving position.

4. In a device of the class described, opposite heads spaced apart, a pneumatic diaphragm on the inner face of each head, a support for said heads, means for moving said heads from a receiving position to a delivery position, means for inflating the diaphragm when in a receiving position, means for deflating the diaphragm at the delivery position, pneumatic means for returning the heads to a receiving position and means for limiting the movement of the head in either direction.

5. In a device of the class described, opposite heads spaced apart, a pneumatic diaphragm on the inner face of each head, a support for said heads, means for moving said heads from a receiving position to a delivery position, means for inflating the diaphragm when in a receiving position, means for oscillating the said heads in their supports, and pneumatic means for returning the heads to a receiving position.

6. In a device of the class described, opposite heads spaced apart, a pneumatic diaphragm on the inner face of each head, a support for said heads, means for moving said heads from a receiving position to a delivery position, means for inflating the diaphragm when in a receiving position, means for oscillating the said heads in their supports, pneumatic means for returning the heads to a receiving position, and means for limiting the movement of the heads in either direction.

7. In a device of the class described, opposite heads spaced apart, a pneumatic diaphragm on the inner face of each head, a support for said heads, means for moving said heads from a receiving position to a delivery position, means for inflating the diaphragm when in a receiving position, means for deflating the diaphragm at the delivery position, means for returning the heads to a receiving position, and means for limiting the movement of the heads in either direction.

8. In a device of the class described, opposite heads spaced apart, a pneumatic diaphragm on the inner face of each head, a support for said heads, means for moving said heads from a receiving position to a delivery position, means for inflating the diaphragm when in a receiving position, means for deflating the diaphragm at the delivery position, means for returning the heads to a receiving position, pneumatic means for limiting the movement of the heads to a delivery position, and adjustable means for limiting the movement of the heads to a receiving position.

9. In a device of the class described, opposite heads spaced apart, a pneumatic diaphragm on the inner face of each head, a support for said heads, means for moving said heads from a receiving position to a delivery position, means for inflating the diaphragm when in a receiving position, means for deflating the diaphragm at the delivery position, means for oscillating said heads in their supports, means for returning the heads to a receiving position, pneumatic means for limiting the movement of the heads to a delivery position, and adjustable means for limiting the movement of the heads to a receiving position.

10. In a device of the class described, opposite heads spaced apart, a pneumatic diaphragm on the inner face of each head, a support for said heads, means for moving said heads from a receiving position to a delivery position, means for inflating the diaphragm when in a receiving position, means for rotating the said heads in their supports, pneumatic means for returning the heads to a receiving position, pneumatic means for limiting the movement of the heads to a delivery position, and adjustable means for limiting the movement of the heads to a receiving position.

11. In a device of the class described, opposite heads spaced apart, a pneumatic diaphragm on the inner face of each head, a support for said heads, means for moving said heads from a receiving position to a delivery position, means for inflating the diaphragm when in a receiving position, means for deflating the diaphragm at the delivery position, pneumatic means for returning the heads to a receiving position, pneumatic means for limiting the movement of the heads to a delivery position, and adjustable means for limiting the movement of the heads to a receiving position.

12. In a device of the class described, opposite heads spaced apart, a pneumatic diaphragm on the inner face of each head, a support for said heads, means for moving said heads from a receiving position to a delivery position, means for inflating the diaphragm when in a receiving position, means for deflating the diaphragm at the delivery position, pneumatic means for returning the heads to a receiving position, and adjustable means for controlling said pneumatic returning means.

13. In a device of the class described, opposite heads spaced apart, a pneumatic diaphragm on the inner face of each head, a support for said heads, means for moving said heads from a receiving position to a delivery position, means for inflating the diaphragm when in a receiving position, means for oscillating the said heads in their supports, pneumatic means for returning the heads to a receiving position, and adjustable means for controlling said pneumatic returning means.

14. In a device of the class described, opposite heads spaced apart, a pneumatic diaphragm on the inner face of each head, a support for said heads, means for moving said heads from a receiving position to a delivery position, means for inflating the diaphragm when in a receiving position, means for oscillating the said heads in their supports, pneumatic means for returning the heads to a receiving position, adjustable means for controlling said pneumatic returning means, and means for limiting the movement of the heads in either direction.

15. In a device of the class described, opposite heads spaced apart, a pneumatic diaphragm on the inner face of each head, a support for said heads, means for moving said heads from a receiving position to a delivery position, means for inflating the diaphragm when in a receiving position, means for deflating the diaphragm at the delivery position, pneumatic means for returning the heads to a receiving position, adjustable means for controlling said pneumatic returning means, pneumatic means for limiting the movement of the heads to a delivery position, and adjustable means for limiting the movement of the heads to a receiving position.

16. In a device of the class described, opposite heads spaced apart, a pneumatic diaphragm on the inner face of each head, a support for said heads, means for moving said heads from a receiving position to a delivery position, means for inflating the diaphragm when in a receiving position, means for oscillating the said heads in their supports, pneumatic means for returning the heads to a receiving position, adjustable means for controlling said pneumatic returning means, pneumatic means for limiting the movement of the heads to a delivery position, and adjustable means for limiting the movement of the heads to a receiving position.

17. In a device of the class described, opposite heads spaced apart, a pneumatic diaphragm on the inner face of each head, a support for said heads, means for adjusting said heads relative to said support, means for moving said heads from a receiving position to a delivery position, means for inflating the diaphragm when in a receiving position, means for deflating, the diaphragm at the delivery position and means for returning the heads to a receiving position.

18. In a device of the class described, opposite heads spaced apart, a pneumatic diaphragm on the inner face of each head, a support for said heads, means for adjusting said heads relative to said supports, means for moving said heads from a receiving position to a delivery position, means for inflating the diaphragm when in a receiving position, means for deflating the diaphragm at the delivery position, means for oscillating the said heads in their supports, and means for returning the heads to a receiving position.

19. In a device of the class described, opposite heads spaced apart, a pneumatic diaphragm on the inner face of each head, a support for said heads, means for adjusting said heads relative to said supports, means for moving said heads from a receiving position to a delivery position, means for inflating the diaphragm when in a receiving position, means for deflating the diaphragm at the delivery position, means for oscillating the said heads in their supports, and pneumatic means for returning the heads to a receiving position.

20. In a device of the class described, opposite heads spaced apart, a pneumatic diaphragm on the inner face of each head, a support for said heads, means for adjusting said heads relative to said supports, means for moving said heads from a receiving position to a delivery position, means for inflating the diaphragm when in a receiving position, means for deflating the diaphragm at the delivery position, means for oscillating the said heads in their supports, pneumatic means for returning the heads to a receiving position, and means for limiting the movement of the heads in either direction.

21. In a device of the class described, opposite heads spaced apart, a pneumatic diaphragm on the inner face of each head, a support for said heads, means for adjusting said heads relative to said supports, means for moving said heads from a receiving position to a delivery position, means for inflating the diaphragm when in a receiving position, means for deflating the diaphragm at the delivery position, means for oscillating the said heads in their supports, pneumatic means for returning the heads to a receiving position, pneumatic means for limiting the movement of the heads to a delivery position, and adjustable means for limiting the movement of the heads to a receiving position.

22. In a device of the class described, opposite heads spaced apart, a pneumatic diaphragm on the inner face of each head, a support for said heads, means for adjusting said heads relative to said support, means for moving said heads from a receiving position to a delivery position, means for inflating the diaphragm when in a receiving position, means for deflating the diaphragm at the delivery position, and pneumatic means for returning the heads to a receiving position.

23. In a device of the class described, opposite heads spaced apart, a pneumatic diaphragm on the inner face of each head, supports for said heads, means for adjusting said heads relative to said supports, means for moving said heads from a receiving position to a delivery position, means for inflating the diaphragm when in a receiving position, means for deflating the diaphragm at the delivery position, means for oscillating the said heads in their supports, pneumatic means for returning the heads to a receiving position, and adjustable means for controlling said pneumatic returning means.

24. In a device of the class described, opposite heads spaced apart, a pneumatic diaphragm on the inner face of each head, a support for said heads, means for adjusting said heads relative to said support, means for moving said heads from a receiving position to a delivery position, means for inflating the diaphragm when in a receiving position, means for deflating the diaphragm at the delivery position, pneumatic means for returning the heads to a receiving position, and adjustable means for controlling said pneumatic returning means.

25. In a device of the class described, gripers, means for actuating the gripers to pick up a plastic block, means for actuating the said gripers to release said block, oscillating supports for carrying said gripers from a receiving position to a delivery position, and means for actuating said supports.

26. In a device of the class described, gripers, means for actuating the gripers to pick up a plastic block, means for actuating the said gripers to release said block, oscillating supports for carrying said gripers from a receiving position to a delivery position, and means for actuating said supports, the pivot of said oscillating support being substantially beneath the receiving position of said gripers.

27. In a device of the class described, pneumatic gripers, pneumatic means for actuating the gripers to pick up a plastic block, pneumatic means for actuating the said gripers to release said block, oscillating supports for carrying said gripers from a receiving position to a delivery position, and means for actuating said supports.

28. In a device of the class described, pneumatic gripers, pneumatic means for actuating the gripers to pick up a plastic block, pneumatic means for actuating the said griping devices to release said block, oscillating supports for carrying said gripers from a receiving position to a delivery position, and means for actuating said supports, the pivot of said oscillating support being substantially beneath the receiving position of said gripers.

29. In a device of the class described, gripers, means for actuating the gripers to pick up a plastic block, means for actuating the said gripers to release said block, oscillating supports for carrying said gripers from a receiving position to a delivery position, and pneumatic means for moving said gripers from a delivery position to a receiving position.

30. In a device of the class described, gripers, means for actuating the gripers to pick up a plastic block, means for actuating the said gripers to release said block, oscillating supports for carrying said gripers from a receiving position to a delivery position, means for oscillating said gripers relative to said support, and means for actuating said supports.

31. In a device of the class described, gripers, means for actuating the gripers to pick up a plastic block, means for actuating the said gripers to release said block, oscillating supports for carrying said gripers from a receiving position to a delivery position, means for oscillating said gripers relative to said support, and means for actuating said supports, the pivot of said oscillating support being substantially beneath the receiving position of said gripers.

32. In a device of the class described, pneumatic gripers, pneumatic means for actuating the gripers to pick up a plastic block, pneumatic means for actuating the said gripers to release said block, oscillating supports for carrying said gripers from a receiving position to a delivery position, means for oscillating said gripers relative to said supports and means for actuating said supports.

33. In a device of the class described, gripers, means for actuating the gripers to pick up a plastic block, means for actuating the said gripers to release said block, oscillating supports for carrying said gripers from a receiving position to a delivery position, means for oscillating said gripers relative to said support, the pivot of said oscillating support being substantially beneath the receiving position of said gripers, the pneumatic means for moving said gripers from a delivery position to a receiving positon.

34. In a device of the class described, pneumatic gripers, pneumatic means for actuating the gripers to pick up a plastic block, pneumatic means for actuating the said gripers to release said block, oscillating supports for carrying said gripers from a receiving position to a delivery position, means for oscillating said gripers relative to said supports, and means for actuating said supports, the pivot of said oscillating support being substantially beneath the receiving position of said gripers.

35. In a device of the class described, pneumatic gripers, pneumatic means for actuating the gripers to pick up a plastic block, pneumatic means for actuating the said gripers to release said block. oscillating supports for carrying said gripers from a receiving position to a delivery position, means for oscillating said gripers relative to said support, and pneumatic means for moving said gripers from a delivery position to a receiving position, the pivot of said oscillating support being substantially beneath the receiving position of said gripers.

36. In a device of the class described, gripers, means for actuating the gripers to pick up a plastic block, means for actuating the said gripers to release said block, oscillating supports for carrying said gripers from a receiving position to a delivery position, means for adjusting said gripers relative to said support for blocks and tile of different shapes and sizes, and means for actuating said supports.

37. In a device of the class described, gripers, means for actuating the gripers to pick up a plastic block, means for actuating the said gripers to release said block, oscillating supports for carrying said gripers from a receiving position to a delivery position, means for adjusting said gripers relative to said support for blocks and tile of different shapes and sizes, and means for actuating said supports, the pivot of said oscillating support being substantially beneath the receiving position of said gripers.

38. In a device of the class described, gripers, means for actuating the gripers to pick up a plastic block, means for actuating the said gripers to release said block, oscillating supports for carrying said gripers from a receiving position to a delivery position, means for oscillating said gripers relative to said support, means for adjusting said gripers relative to said support for blocks and tile of different shapes and sizes, and means for actuating said supports, the pivot of said oscillating support being substantially beneath the receiving position of said gripers.

39. In a device of the class described, gripers, means for actuating the gripers to pick up a plastic block, means for actuating the said devices to release said block, a support for carrying said gripers from a receiving position to a delivery position, and means for actuating said support.

40. In a device of the class described, gripers, means for actuating the gripers to pick up a plastic block, means for actuating the said devices to release said block, a support for carrying said gripers from a receiving position to a delivery position, means for oscillating said gripers relative to said support, and means for actuating said support.

ALFRED G. HAGUE.